United States Patent [19]

Takayama

[11] Patent Number: 4,811,618
[45] Date of Patent: Mar. 14, 1989

[54] MOTION CONVERSION MECHANISM
[75] Inventor: Sui Takayama, Hiratsuka, Japan
[73] Assignees: Nippon Gear Co., Ltd.; Atsugi Machinery Co., Ltd., both of Japan
[21] Appl. No.: 76,151
[22] Filed: Jul. 21, 1987
[30] Foreign Application Priority Data Dec. 12, 1986 [JP] Japan .............................. 61-191346[U]
Feb. 9, 1987 [JP] Japan .............................. 62-17553[U]
May 20, 1987 [JP] Japan .............................. 62-75335[U]

[51] Int. Cl.⁴ .................................................. F16H 25/24
[52] U.S. Cl. ................................. 74/89.15; 411/438; 74/424.8 R; 74/458
[58] Field of Search ................................. 29/159.2, 456; 74/89.15, 424.8 R, 458, 459; 411/438, 432, 902, 903, 907, 908; 384/292; 428/371

[56] References Cited
U.S. PATENT DOCUMENTS

| 2,152,681 | 4/1939 | Caminez | 411/438 |
| 2,341,670 | 2/1944 | Stinson | 411/438 |
| 2,995,948 | 8/1961 | Galonska et al. | 74/459 |
| 3,081,644 | 3/1963 | Hudgens et al. | 74/459 |
| 3,104,583 | 9/1963 | Gasche | 411/438 |
| 3,407,251 | 10/1968 | Elliott et al. | 411/902 |
| 3,643,522 | 2/1972 | Fullam | 74/459 |
| 4,052,076 | 10/1977 | Wysong | 74/459 |
| 4,114,508 | 9/1978 | Loeser et al. | 411/903 |

FOREIGN PATENT DOCUMENTS

| 800352 | 10/1950 | Fed. Rep. of Germany | 411/438 |
| 12220 | 7/1900 | United Kingdom | 74/459 |
| 610869 | 10/1948 | United Kingdom | 411/438 |
| 610870 | 10/1948 | United Kingdom | 29/456 |

Primary Examiner—Allan D. Herrmann
Assistant Examiner—Janice E. Chartoff
Attorney, Agent, or Firm—Davis, Bujold & Streck

[57] ABSTRACT

A motion conversion mechanism comprising a threaded shaft and a nut, is disclosed. The nut comprises a cylindrical body having the inner surface thereof formed with a groove corresponding to the thread of the threaded shaft. A string having a low friction property surface is fitted in the groove such that it partly projects from the inner peripheral surface of the cylindrical body. The projecting portion of the string constitutes a thread to be screwed with the thread of the threaded shaft.

12 Claims, 1 Drawing Sheet

MOTION CONVERSION MECHANISM

BACKGROUND OF THE INVENTION 1. (Field of the Invention)

This invention relates to a motion conversion mechanism comprising a threaded shaft and a nut for converting rotation into a translational motion.

2. (Prior Art)

As a motion conversion mechanism for converting rotation into a translational motion, there is one comprising a threaded shaft and a nut screwed thereon. Herefore, for permitting smoother motion of the nut in such a motion translation mechanism, use has made of various ball screw nuts featuring low frictional resistance.

When the nut of the motion conversion mechanism is a ball screw nut, it is possible to obtain smooth motion of the nut. In the aspect of the manufacture, however, high precision is required for the groove, in which the ball is meshed. Further, lubricant is required. Therefore, the mechanism is not suited for use in places where the foodstuff and chemicals are dealt with and oil is detested. Further, its use in water is not suited because of the generation of rust.

An object of the invention is to provide a motion conversion mechanism which can solve the above problems.

SUMMARY OF THE INVENTION

To attain the above object of the invention, there is provided a mition conversion mechanisms comprising a threaded shaft and a nut, in which the cylindrical body of the nut is formed with a groove corresponding to the thread of the threaded shaft, a string having a surface having a low friction property is fitted in the groove such that it partly projects from the inner surface of the cylindrical body, and the projecting portion of the string comprises the thread meshing with the thread of the threaded shaft.

Since the inner periphery of the cylindrical body of the nut is formed with a thread with a string having high processibility for providing a low friction surface and the thread is fitted in the thread of the threaded shaft, it is possible to reduce the frictional resistance between the nut and thread of the threaded shaft due to low friction property of the string and obtain very smooth motion of the nut on the threaded shaft. Further, since the string of the fluorine resin does not use lubricant, the mechanism can be used in a place detesting oil. Further, since the mechanism has excellent water-proof property, it can be used in water.

DETAILED DESCRIPTION OF THE PREFERRED EMBODIMENT

Now, the motion conversion mechanism according to the invention will be described in detail in conjunction with an embodiment thereof with reference to the drawings.

Figure 1:
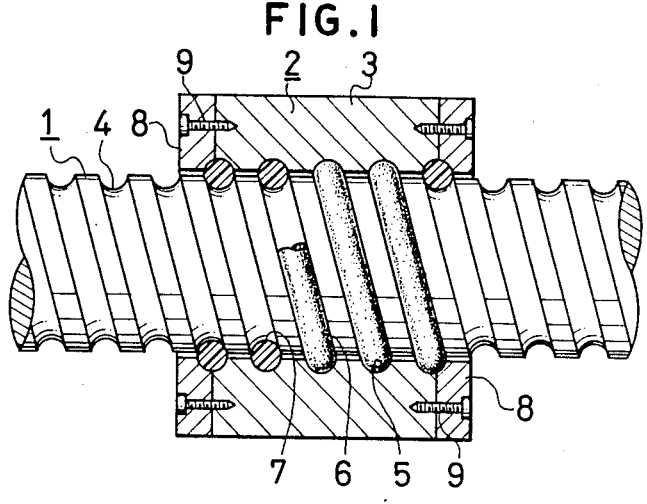
FIG. 1 is a sectional view showing an embodiment of the invention.

Referring to the FIG. 1, reference numeral 1 designates a threaded shaft, and 2 a nut to be screwed with the threaded shaft. The cylindrical body 3 of the nut 2 has its inner peripheral surface formed with a groove 5 corresponding to the thread 4 of the threaded shaft 1. In the groove 5, a string 6 mainly comprising a fluorine resin is detachably fitted such that it partly projects from the inner peripheral surface, i.e., grooves 5, of the body 3. the projecting portion of the string 6 constitutes a thread meshed in the thread 4 of the threaded shaft 1. Reference numeral 8 designates retaining rings, which are secured to the opposite open ends of the body 3 for preventing the string 6 fitted in the groove 5 formed in the inner peripheral surface of the body 3 from being detached from the body 3 and retaining it fitted in the groove 5. The retaining rings 8 are detachably secured by screws 9 to the body 3. The string 6 having low friction propery comprises a fluorine resin incorporating at least one member of a group comprising graphite, glass fiber, bronze and carbon black.

Also thermoplastic resins may be applied as a main material of said string 6, and in this embodiment acetal resins, especially acetal copolymer or acetal homopolymer, are used though the main material not being limited to them. Further glass short fibers such as graphite or glassfiber may be added according to demand.

Figure 2:
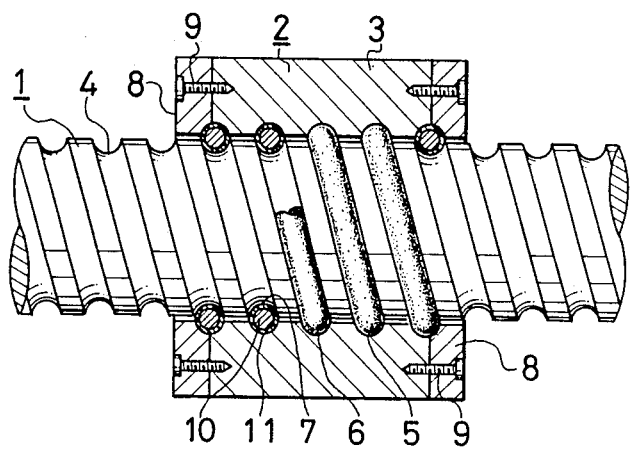
FIG. 2 is a sectional view showing a different embodiment of the invention.

FIGS. 2 and 3 show different examples of the string 6.

Figure 3A:
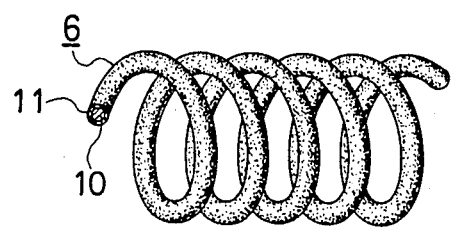
FIGS. 3A and 3B are perspective views showing respective examples of the string.
Figure 3B:
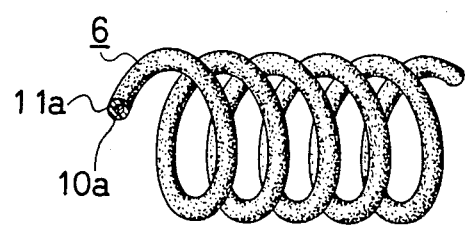

The example of the string 6 shown in FIG. 2 comprises a metal core and has a low friction surface. More specifically, as shown in FIG. 3A, it comprises a metal wire 10 coated with a fluorine resin. In the example shown in FIG. 3B, a metal wire 10a is inserted in a tube 11a made of a fluorine resin. The string 6 may further be formed by processing the metal wire 10 into the form of a coil having a pitch corresponding to the pitch of the groove 5 of the body 3, forming a fluorine resin layer 11 on the surface of the coil-like metal wire 10 and fitting this coil-like string 6 in the groove 5 of the body 3. Further, it is possible to form a linear string 6 comprising a linear metal wire 10 and a fluorine resin layer coating 11 into the form of a coil and fit this coil-like string 6 in the groove 5 of the body 3. Further, it is possible to progressively fit a linear string 6 in the groove of the body 3. Further, it is possible to mold the fluorine resin into a coil-like string.

The metal wire 10 preferably comprises steel, copper, aluminum, etc.

As has been described in the foregoing, in the motion conversion mechanism comprising a threaded shaft and a nut, the cylindrical body of the nut has its inner peripheral surface formed with a groove corresponding to the thread of the threaded shaft, a string mainly comprising a fluorine resin is fitted in the groove such that it partly projects from the inner peripheral surface of the cylindrical body, and the projecting portion of the string comprises the thread meshed with the thread of the threaded shaft. Therefore, only the string comprising the engagement section between the screw and nut can be separately and simply processed to form a low friction coating, i.e., fluorine resin coating. Due to low friction property as material property of the string, which uses as base material a fluorine resin forming the thread of the nut and meshed with the thread of the screw shaft, the frictional resistance between the thread of the nut and the thread of the threaded shaft is low, and it is possible to obtain an extremely smooth motion of the nut on the threaded shaft without need of any lubricant. Further, since no lubricant is needed, the mechanism can be used in a place detesting oil. Further, since the mechanism is excellent in the water durability, it can be used in water. Further, the mechanism can be used in a place where the prior art motion conversion mechanism of the pertaining cannot be used. Thus, the scope of applications of the mechanism can be extended, which is very convenient as the motion conversion mechanism. Further, the mechanism is simple in construction and can be manufactured readily and hence inexpensively. Further, the thread, i.e., the string, can be readily replaced.

I claim:

1. A motion conversion mechanism comprising a threaded shaft and a nut, said nut comprising cylindrical body having the inner surface thereof formed with a groove corresponding to a thread of said threaded shaft, a helical member molded with a material mainly composed of a fluorine resin being closely received in the groove so that it may partly project from the inner peripheral surface of said cylindrical body, the projecting portion of said helical member having a thread to be screwed with the thread of said threaded shaft.

2. The motion conversion mechanism according to claim 1, wherein said helical member is molded from a resin material incorporating short glass fiber.

3. The motion conversion mechanism according to claim 1, wherein said helical member is molded from a resin material incorporating bronze.

4. The motion conversion mechanism according to claim 1, wherein said helical member is molded from a resin material incorporating carbon black.

5. The motion conversion mechanism according to claim 1, wherein said helical member is molded from a resin material incorporating at least two of the following materials: short glass fibre, bronze and carbon black.

6. A motion conversion mechanism comprising a threaded shaft and a nut, said nut comprising a cylindrical body having the inner surface thereof formed with a groove corresponding to a thread of said threaded shaft, a helical member made of thermoplastic resin, comprising one of polyacetal resin, acetal copolyer, and acetal homopolymer and having a low friction property surface, being closely received in said groove such that it partly projects from the inner peripheral surface of said cylindrical body, the projecting portion of said helical member constituting a thread to be screwed with the thread of said threaded shaft.

7. A motion conversion mechanism comprising a threaded shaft and a nut, said nut comprising a cylindrical body having the inner surface thereof formed with a groove corresponding to a thread of said threaded shaft, a helical member comprising a metal wire with a fluorine resin coating be closely received in said groove such that it partly projects from the inner peripheral surface of said cylindrical body, the projecting portion of said helical member comprising a thread to be screwed with the thread of said threaded shaft.

8. The motion conversion mechanism according to claim 7, wherein said helical member comprises a metal wire with a fluorine resin coating formed on the surface of the metal wire.

9. The motion conversion mechanism according to claim 7, wherein said helical member comprising a metal wire with a fluorine resin coating is formed by inserting a metal wire in a tube made of a fluorine resin.

10. A motion conversion mechanism comprising a threaded shaft and a nut, said nut comprising a cylindrical body having the inner surface thereof formed with a groove corresponding to a thread of said threaded shaft, helical member comprising a metal wire with a layer of thermoplastic resin comprising one of acetal resin, acetal copolymer, acetal homopolymer, being closely received in said groove such that it partly projects from the inner peripheral surface of said cylindrical body, the projecting portion of said helical member comprising a thread to be screwed with the thread of said threaded shaft.

11. The motion conversion mechanism according to claim 10, wherein said helical member is a metal wire with a layer of one of said thermoplastic resins being formed on the surface of the metal wire.

12. The motion conversion mechanism according to claim 10, wherein said helical member is a metal wire being inserted into a tube made of one of said thermoplastic resins.

* * * * *